May 17, 1932.  F. HÖRNING  1,858,330

INSTALLATION FOR HEATING THE GROUND

Filed March 14, 1928

F. Hörning
INVENTOR

By Marks & Clerk
Attys.

Patented May 17, 1932

1,858,330

UNITED STATES PATENT OFFICE

FRANZ HÖRNING, OF STEINHEIM, GERMANY

INSTALLATION FOR HEATING THE GROUND

Application filed March 14, 1928, Serial No. 261,623, and in Germany March 19, 1927.

Strong manure-packings have hitherto been used for obtaining the warmth in the ground which is necessary for early growing in horticulture. This manner of heating the ground is comparatively very expensive, as the surface to be heated has to be excavated accordingly, whereupon the excavation is filled with fresh manure, on which the excavated earth is piled. The ground is then heated by the fermentation process. This manner of heating presents the serious inconvenience that in cool weather it starts feebly and decreases quickly. It is further impossible to regulate the temperature in the ground. The roots of the plants cannot traverse the manure-layer as they decay in the fresh manure. The capillarity of the ground is also impaired by the manure.

This invention has for its object to avoid these inconveniences and to provide a device which will effectively warm and sterilize the soil. With this object in view heat-steam is supplied by supply-pipes to a pervious pipe-conduit located in the ground. To maintain the heat-elimination of the distributing-conduit as uniform as possible over the entire length of the same, the heat-steam is injected through supply-openings into preferably parallel parts of the distributing conduit, so that the steam is flowing permanently in the same direction. The water from condensation passes through the pores of the distributing conduit into the ground and moistens the same so that, notwithstanding the heating, the ground does not dry very much.

It is further possible to supply air to the distributing conduit so that the ground is well aired at the same time.

Three embodiments of the invention are diagrammatically illustrated in the accompanying drawings, in which Fig. 1 shows in top-plan view a distributing conduit fed by only one supply-pipe.

Figure 1:
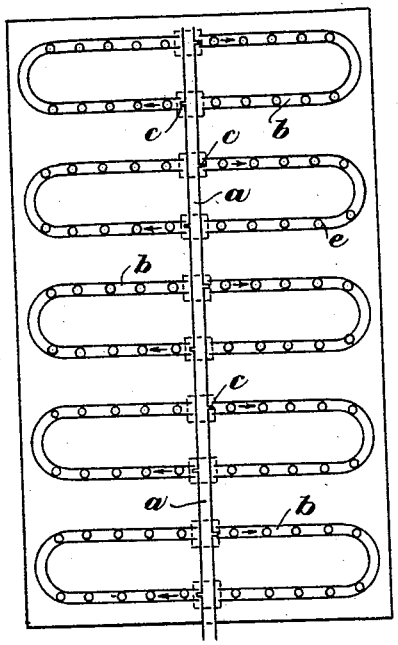

As shown in Fig. 1 of the drawings $a$ designates the supply-pipes, $b$ the rectangular shaped distributing pipe and $c$ the outflow-openings and the points at which the supply-pipe joins or intersects the distributing pipes. The distributing pipes are provided with perforations $e$ to permit the egress of steam.

Figure 2:
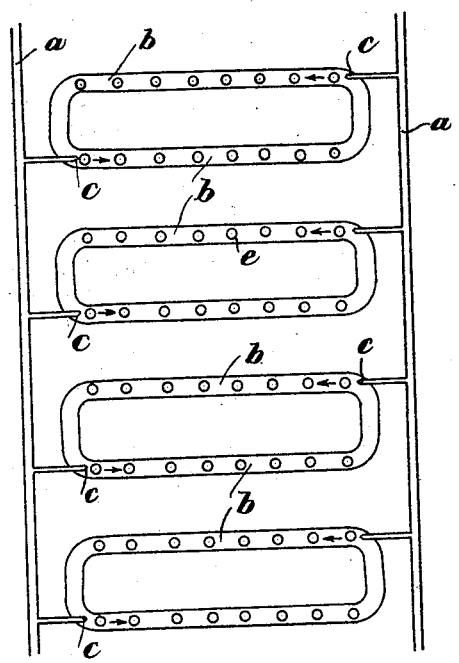
Fig. 2 is a similar view as Fig. 1 in which two supply-pipes are arranged, one at either side of the distributing system.

As shown in Fig. 2 a supply-pipe $a$ is arranged one at each side of the distributing pipes $b$ in order to overcome the tendency to form condensate at the sides thereof.

Figure 3:
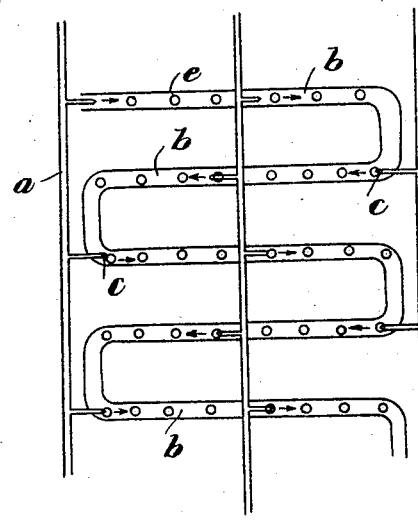
Fig. 3 shows an open pipe-system with three supply-pipes.

In Fig. 3 the distributing pipe $b$ is open at its terminals in order that fresh air can enter with the steam at one terminal from one supply pipe $a$, and since the supply pipes are open at their ends the discharged steam may be utilized for heating purposes. The distributing pipe in Fig. 3 is of the sinuous form and may be made of sections suitably united to form a one-piece unit or discharge pipe. It will be observed that in all forms of the invention that the steam outlets are arranged in alternate position.

I claim:—

1. A sterilizing and heating apparatus for soil comprising a plurality of distributing pipes pervious to steam, and a steam supply pipe, said supply pipe having its steam outlets connected alternately to said distributing pipes in opposite directions whereby the flow of steam in said distributing pipes is in one direction.

2. A sterilizing and heating apparatus for soil comprising a plurality of rectangular shaped distributing pipes pervious to steam, and a pair of steam supply pipes extending over the entire distributing system, one of said supply pipes being connected respectively to the same side of each of said distributing pipes, said other steam supply pipe being connected to each of said distributing pipes at the side opposite the connection of the first supply pipe.

3. A sterilizing and heating apparatus for soil comprising a single distributing pipe, a pair of steam supply pipes, said steam supply pipes having their steam outlets connected to said distributing pipe respectively at opposite sides thereof, whereby the flow of steam in said distributing pipe is in one direction.

4. A sterilizing and heating apparatus for soil comprising rectangular shaped distributing pipes, a pair of steam supply conduits extending over the entire distributing system, one of said supply pipes having a steam outlet connected to one side of said distributing pipes, said other supply pipe having an outlet connected to said distributing pipes at the side opposite the connection of the outlet of the first supply pipe and directed in an opposite direction from the outlet of the first supply pipes.

5. A sterilizing and heating apparatus for soil comprising a distributing pipe, pipes for supplying steam to the distributing pipe and having steam outlets to the distributing pipe in alternate position to cause the steam to flow through the distributing pipe in one direction, and means for admitting air into the distributing pipe.

6. A sterilizing and heating apparatus for the purpose specified, comprising a distributing pipe pervious to steam, a steam supply means, said supply means having steam outlets discharging in the distributing pipe in alternate directions.

In testimony whereof I affix my signature.

FRANZ HÖRNING.